(No Model.)
L. J. MELL.
FISHING APPARATUS.
No. 578,085. Patented Mar. 2, 1897.
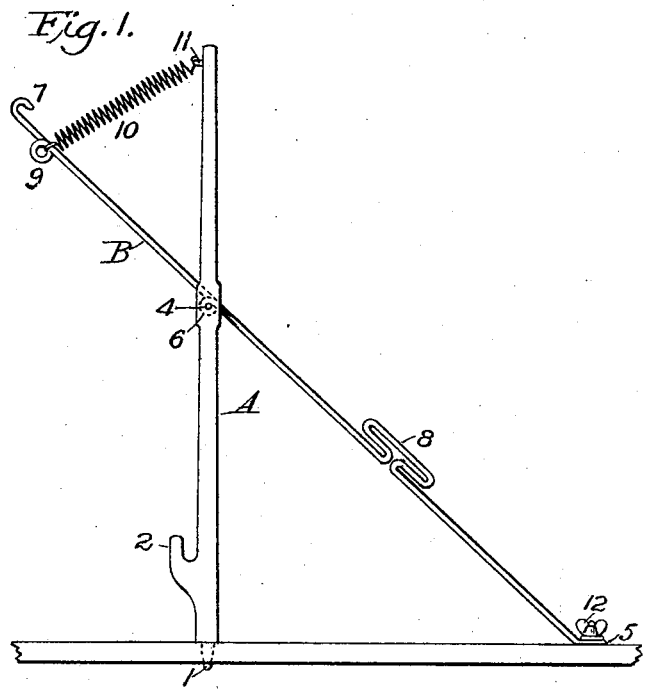
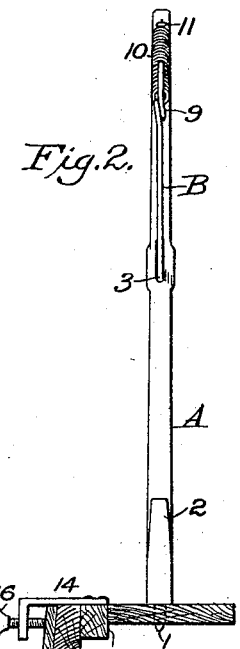
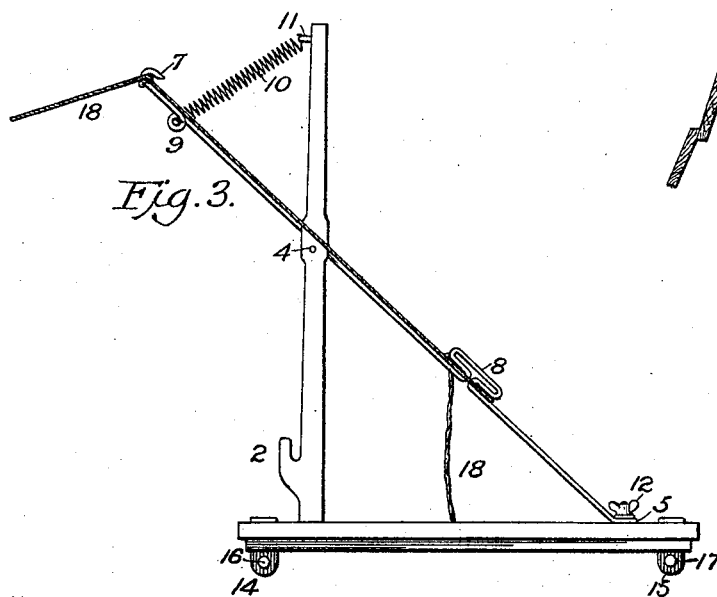
Witnesses
James F. Duhamel
K. A. Dean
Inventor,
Luther J. Mell,
by John Wedderburn
Attorney

UNITED STATES PATENT OFFICE.

LUTHER J. MELL, OF NEW YORK, N. Y., ASSIGNOR OF ONE-HALF TO WILLIAM S. ANDERSON, OF MOUNT VERNON, NEW YORK.

FISHING APPARATUS.

SPECIFICATION forming part of Letters Patent No. 578,085, dated March 2, 1897.

Application filed June 11, 1896. Serial No. 595,090. (No model.)

*To all whom it may concern:*

Be it known that I, LUTHER J. MELL, a citizen of the United States, residing in the city of New York, in the county of New York and State of New York, have invented certain new and useful Improvements in Fishing Apparatuses; and I do hereby declare the following to be a full, clear, and exact description of the invention, such as will enable others skilled in the art to which it appertains to make and use the same.

This invention relates to fishing-tackle, and more particularly to an apparatus adapted for attachment to the boat or dock and for holding the fishing-line.

My object is to provide an improved, cheap, and simple device of the class described which will be adapted for still fishing and for trolling.

A further object is the provision of a fishing apparatus adapted for quick and easy attachment and which when not in use can be folded into compact form for transportation.

Having these objects in view, the invention consists of certain peculiar arrangements of parts and novel features, as will appear more fully hereinafter.

In the accompanying drawings, Figure 1 is a side elevation showing the invention applied to my improved outrigger as attached to an ordinary row-boat; Fig. 2, a front edge view of the same, showing the boat in section; and Fig. 3, a view showing the invention in use.

A designates a standard or support having a prong 1 at its lower end and provided with a cleat 2. In the upper portion of the standard is a slot 3, through which extends a pivot-pin 4.

B designates the fishing-rod, which is formed out of a piece of stout spring brass wire. The lower end of the rod is formed into an eye 5. The upper portion of the rod is twisted into a loop 6, which encircles the pivot-pin, while its extreme upper end is provided with an upwardly-bent hook 7.

The numeral 8 designates a cleat formed by bends in the wire, and 9 is an eye. A coil-spring 10 has one end connected to this eye and its other end fastened to a second eye 11 at the top of the standard.

In still fishing the prong is forced into the woodwork of the dock or pier, and a thumbscrew 12 is passed through eye 5 and into the woodwork.

When used for trolling, I employ a wooden outrigger 13, to which the apparatus is fastened, as before described. The base of the outrigger lies flush against the side of the boat, and it is secured to the latter by clamps 14 and 15 and thumb-screws 16 and 17.

The loop or cleat 2 is to receive the blows of a hammer or other implement when the standard is being driven into the woodwork.

The fishing-line 18 is looped around the hook at the end of the fishing-rod and then passed down the rod and wound around the cleat on the latter.

When a fish is hooked, the strain is relieved by the coil-spring and by the bending of the fishing-rod. When not in use, the apparatus can be folded up in compact form for transportation.

Having thus described the invention, what is claimed as new is—

1. In a fishing apparatus, the combination with a permanent support, of a standard or upright connected to the support, and a fishing-rod secured to the standard and also fastened to the support.

2. In a fishing apparatus, the combination with a standard or upright adapted for attachment to a permanent object, of a fishing-rod connected to the standard and to the permanent object, and a spring connecting the fishing-rod to the standard and adapted to offer resistance to the movement of the fishing-rod, substantially as described.

3. In a fishing apparatus, the combination with a standard or upright adapted for attachment to a permanent object, of a fishing-rod having its upper portion pivoted to the standard and its lower portion fastened to the permanent object, and a coil-spring connecting the free end of the fishing-rod to the upper end of the standard, substantially as described.

4. In a fishing apparatus, the combination with a standard or upright adapted for attachment to a permanent object, of a fishing-rod made of a spring wire or rod, said fishing-rod having its upper portion connected to the standard and its lower end connected to the permanent object and being provided with a hook or loop on its upper end and having a cleat on its lower portion, substantially as described.

5. In a fishing apparatus, the combination with a standard or upright adapted for attachment to a permanent object, of a fishing-rod formed of a piece of spring wire or rod pivoted to the standard and having its lower end secured to the permanent object, said fishing-rod being provided with an eye or loop for the fishing-line at its upper free end, and a coil-spring connecting the fishing-rod to the standard, substantially as described.

6. In a fishing apparatus, the combination with a standard or upright having a prong on its lower end and provided with a cleat adapted to receive the blows of a hammer or other implement for driving the prong in a support, of an inclined fishing-rod connected to the standard and to the support, substantially as described.

In testimony whereof I have signed this specification in the presence of two subscribing witnesses.

LUTHER J. MELL.

Witnesses:
WM. S. ANDERSON,
WILLIAM CALL, Jr.